(12) United States Patent
Bauer

(10) Patent No.: US 12,510,177 B2
(45) Date of Patent: Dec. 30, 2025

(54) AUTOMATIC FLUID-MECHANICAL ACTUATED EMERGENCY STOP VALVE FOR ABNORMAL FLOW AND SPILLAGE PROTECTION

(71) Applicant: Matthew J. Bauer, Melbourne, FL (US)

(72) Inventor: Matthew J. Bauer, Melbourne, FL (US)

(*) Notice: Subject to any disclaimer, the term of this patent is extended or adjusted under 35 U.S.C. 154(b) by 61 days.

(21) Appl. No.: 18/447,814

(22) Filed: Aug. 10, 2023

(65) Prior Publication Data
US 2025/0052332 A1  Feb. 13, 2025

(51) Int. Cl.
| | | |
|---|---|---|
| *F16K 17/34* | (2006.01) | |
| *F16K 15/04* | (2006.01) | |
| *F16K 15/18* | (2006.01) | |
| *F16K 17/28* | (2006.01) | |

(52) U.S. Cl.
CPC ........... *F16K 17/34* (2013.01); *F16K 15/04* (2013.01); *F16K 15/1826* (2021.08); *F16K 17/285* (2013.01)

(58) Field of Classification Search
CPC .. F16K 15/04; F16K 15/1823; F16K 15/1826; F16K 17/285; F16K 17/32; F16K 17/34; F16K 31/42; G05D 7/016; G05D 7/0166; Y10T 137/7727; Y10T 137/7764; Y10T 137/7782; Y10T 137/7785; Y10T 137/7792; Y10T 137/87265
See application file for complete search history.

(56) References Cited

U.S. PATENT DOCUMENTS

| | | | | |
|---|---|---|---|---|
| 4,049,015 A | * | 9/1977 | Brown | .................... F16K 15/04 137/533.15 |
| 4,071,038 A | * | 1/1978 | Robinson | ............... F16K 17/285 137/460 |
| 4,108,203 A | * | 8/1978 | Brown | .................... F16K 15/04 137/533.15 |
| 2020/0072366 A1 | * | 3/2020 | Kim | ....................... A43B 13/12 |

* cited by examiner

*Primary Examiner* — Hailey K. Do
(74) *Attorney, Agent, or Firm* — Saliwanchik, Lloyd & Eisenschenk

(57) ABSTRACT

The subject invention pertains to an automatic fluid-mechanical actuated emergency stop valve for inhibiting fluid flow following a catastrophic rupture or other failure in a fluid delivery system carrying a fluid from an upstream source to a downstream destination. A fluidic stop valve which responds to a sudden downstream pipe rupture by closing is provided. The operating mechanism relies upon an increased Bernoulli force acting on a mass opposing a vacuum force tunable by a secondary flow damper. When the mass experiences sufficient Bernoulli force it is then brought up into position to block further fluid flow through the stop valve. The sensitivity of the stop valve to ruptures or sudden flow increases can be tuned by geometric parameters, the stop mass density, and an adjustable setting of the secondary flow damper.

17 Claims, 13 Drawing Sheets

AUTOMATIC FLUID-MECHANICAL ACTUATED EMERGENCY STOP VALVE FOR ABNORMAL FLOW AND SPILLAGE PROTECTION

BACKGROUND OF THE INVENTION

There are many instances where a rupture in liquid or gas lines can cause harm to individuals, property, and the surrounding environment. Such damage can be severe and result in loss of health, loss of life, individual or corporate economic loss, and irreparable ecological damage. An example of harm to individuals includes rupture of industrial hazardous gas lines causing exposure to toxic, corrosive, or flammable gasses in an industrial environment. Property damage is often caused as a result of the rupture of water lines after thaw and freeze cycles. Environmental catastrophes have been the result of oil lines bursting and the subsequent spillage of tons of oil into the surrounding ecological system.

While there exist methods of sensing a rupture by human observation or other sensors, and manually or electronically stopping the flow of the fluid these suffer from the need for human intervention or accessibility of the line to electricity and maintenance of the sensors and sensor networks. Additionally, there is a time delay associated with human or electronic sensing and action. Consider an extremely hazardous gas line within a manufacturing environment. In such a controlled environment there could be hazardous gas sensors at regular intervals and an electronic shut off. For small leaks this can provide an acceptable remedy as by the time gas diffuses to the gas sensor only a small volume of the hazardous gas has been emitted into the environment. However, with an abrupt rupture, a significant volume of hazardous gas can be introduced into the local environment before the gas diffuses to the sensors. Or consider a water line breakage in a personal residence. If the occupants are present significant water damage can still occur in the minutes or hours until the break is observed, even if there are humidity sensors installed and maintained within the residence, significant damage can occur before the sensor reliably determines that there has been increased moisture if the rupture is severe. Furthermore, if there is no sensor system (or if the sensor system has not been serviced with proper maintenance) and no individuals are present, water damage can continually be caused for even longer before the water is shut off. With oil or gas pipelines the delays in observation and remedy for a rupture can cause even more widespread damage. It is not feasible in some cases to place electronic sensors and shut off valves at regular intervals in remote environments.

BRIEF SUMMARY OF THE INVENTION

Embodiments of the subject invention provide systems and methods for fluid flow control through the use of particularly simple, reliable, and fast acting mechanical and fluid driven fail safe mechanisms in fluid distribution systems. Certain embodiments provide an inexpensive to implement and purely mechanical valve which responds to a sudden catastrophic rupture by automatically closing to mitigate hazards and damage related to abrupt rupture or catastrophic failure in a fluid system.

Embodiments can satisfy two conditions in conjunction: sensing the presence of a catastrophic rupture and closing in response to the rupture. In the event a section of line downstream ruptures, the fluid flow through the upstream pipe can increase rapidly. Embodiments provide systems and methods for a rupture shut off valve driven by the detection and/or closing upon sufficiently rapidly increased flow rate. Importantly to the mechanism of operation of the valve in certain embodiments, as the speed of the fluid flowing through a section of pipe increases, the pressure of the fluid in that section drops (e.g., as shown in Bernoulli's Principle.)

Embodiments of a fluidic valve which responds to a sudden downstream pipe rupture by closing are provided. In certain embodiments the operating mechanism advantageously relies upon an increased Bernoulli force acting on a mass opposing a damping force tunable by an adjustable globe valve upstream of the stop mass referred to throughout this text as a damping valve, damper, adjustable damper, or secondary flow damper. When the mass experiences sufficient Bernoulli force it is then brought up into position to block further fluid flow through the valve. The sensitivity of the valve to ruptures or sudden flow increases can be tuned by geometric parameters, by the stop mass density, and by adjusting a setting of the secondary flow damper.

As used herein, the term fluidic means operating primarily or exclusively by the action of fluid forces, including but not limited to the Bernoulli force as referenced above and further described below. As used herein the Bernoulli force means the sum total or net effect of all fluid reaction forces acting on a body, such as but not limited to a stop mass. The Bernoulli force can include a first force caused by and acting generally in alignment with a direction of a fluid flow, such as a suction on a downstream face or side of a body caused by a reduced pressure on that side of the body. The Bernoulli force can also include a second force acting together with or in opposition to the first force, such as a supporting force on an upstream face or side of the body caused by an increased pressure on that side of the body, alternatively an opposing suction on an upstream face or side of the body caused by a reduced pressure on that side of the body.

As used herein, to block a flow means inhibiting or stopping the flow. Inhibiting a flow means making a noticeable or quantifiably measurable reduction in the flow. Stopping a flow means making a complete reduction of the flow, to a point where no substantial and measurable flow continues. Essentially stopping a flow allows for minor leakage of less than 1% of a peak rate of the flow. Substantially inhibiting a flow allows for sustained leakage of less than 10% of a peak rate of the flow. As will be appreciated by one skilled in the art, all descriptions of flow rates, speeds, pressures, and other fluid parameters can refer to a steady state or pseudo steady state framework or analysis, allowing for transient effects approaching the steady state. For example, when a flow is stopped by a stop mass closing a valve seat, the flow can first be inhibited, with a transition period that can include dynamic behavior as the stop mass interacts with the seat before reaching the steady state of stopped or essentially stopped flow.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1A is in a normal flow state without any rupture. FIG. 1B is in a transitional flow state a short time after a catastrophic rupture.

FIG. 1C is in a stopped flow state inhibiting flow after a catastrophic rupture.

DETAILED DISCLOSURE OF THE INVENTION

Figure 1A:
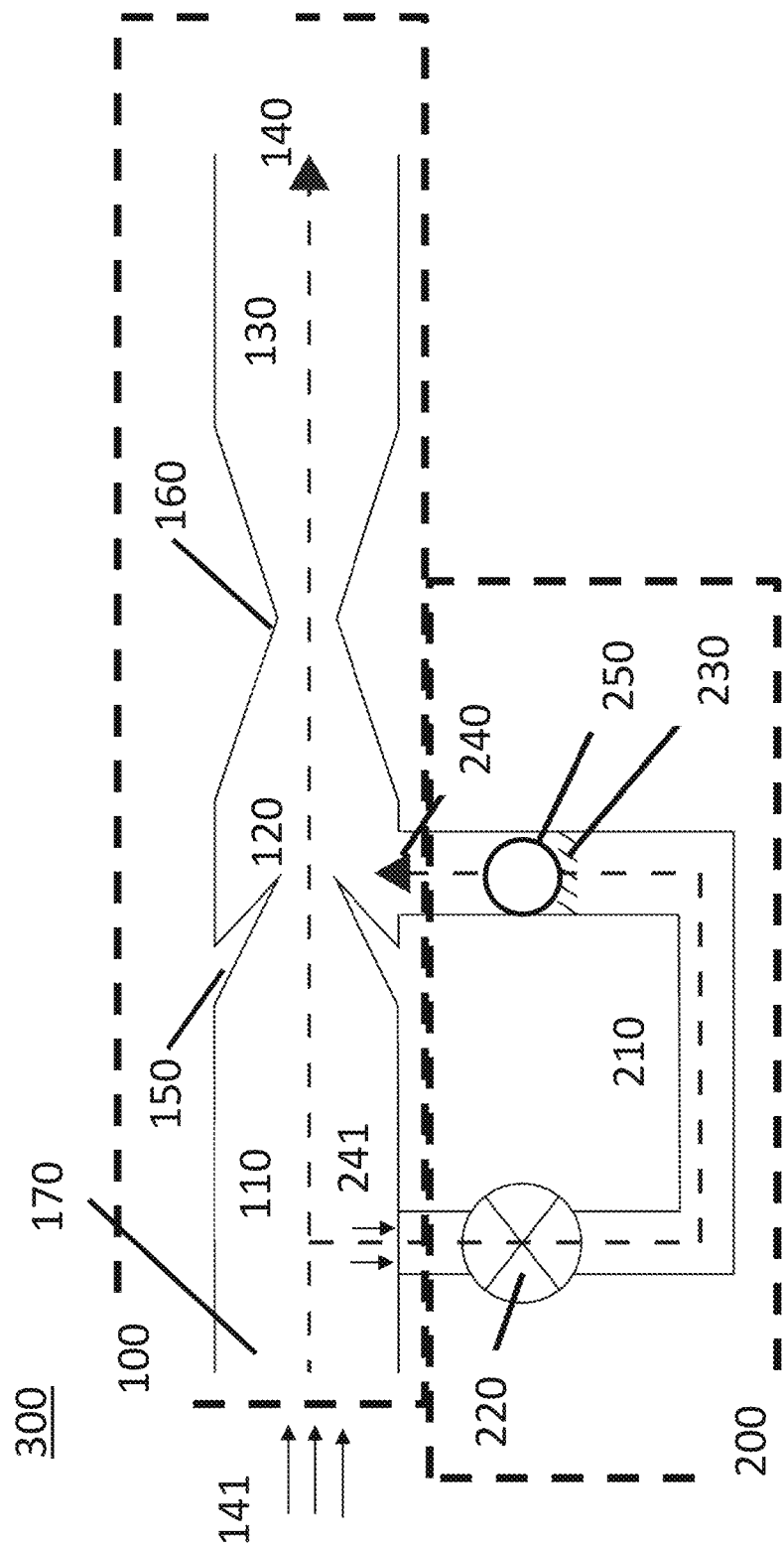
FIGS. 1A-1C: Illustrate a stop valve schematic showing the main fluid flow path and a secondary flow path or dampened vacuum fluid flow path passing through components of the stop valve according to an embodiment of the subject invention.
Figure 1B:
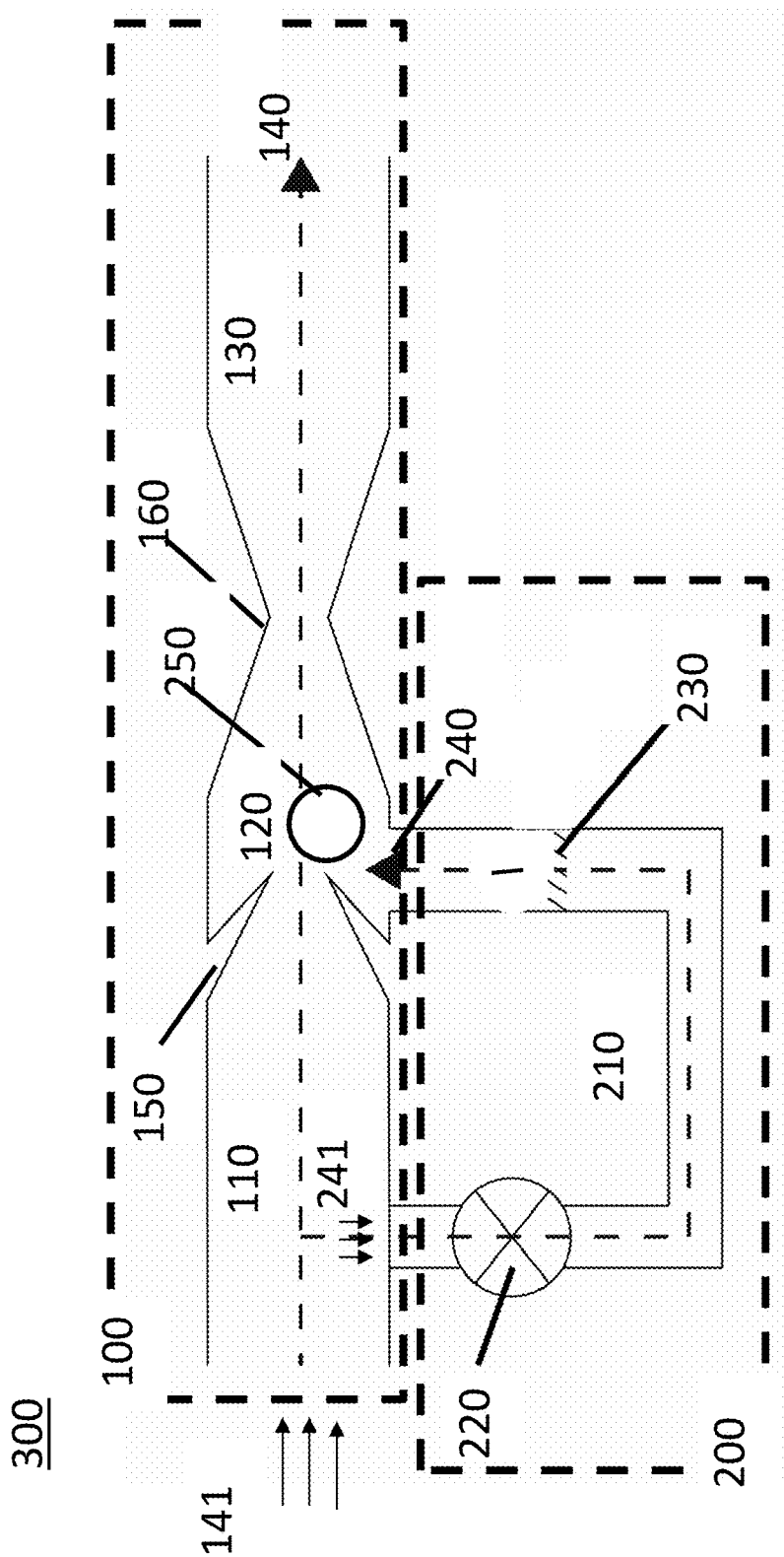
Figure 1C:
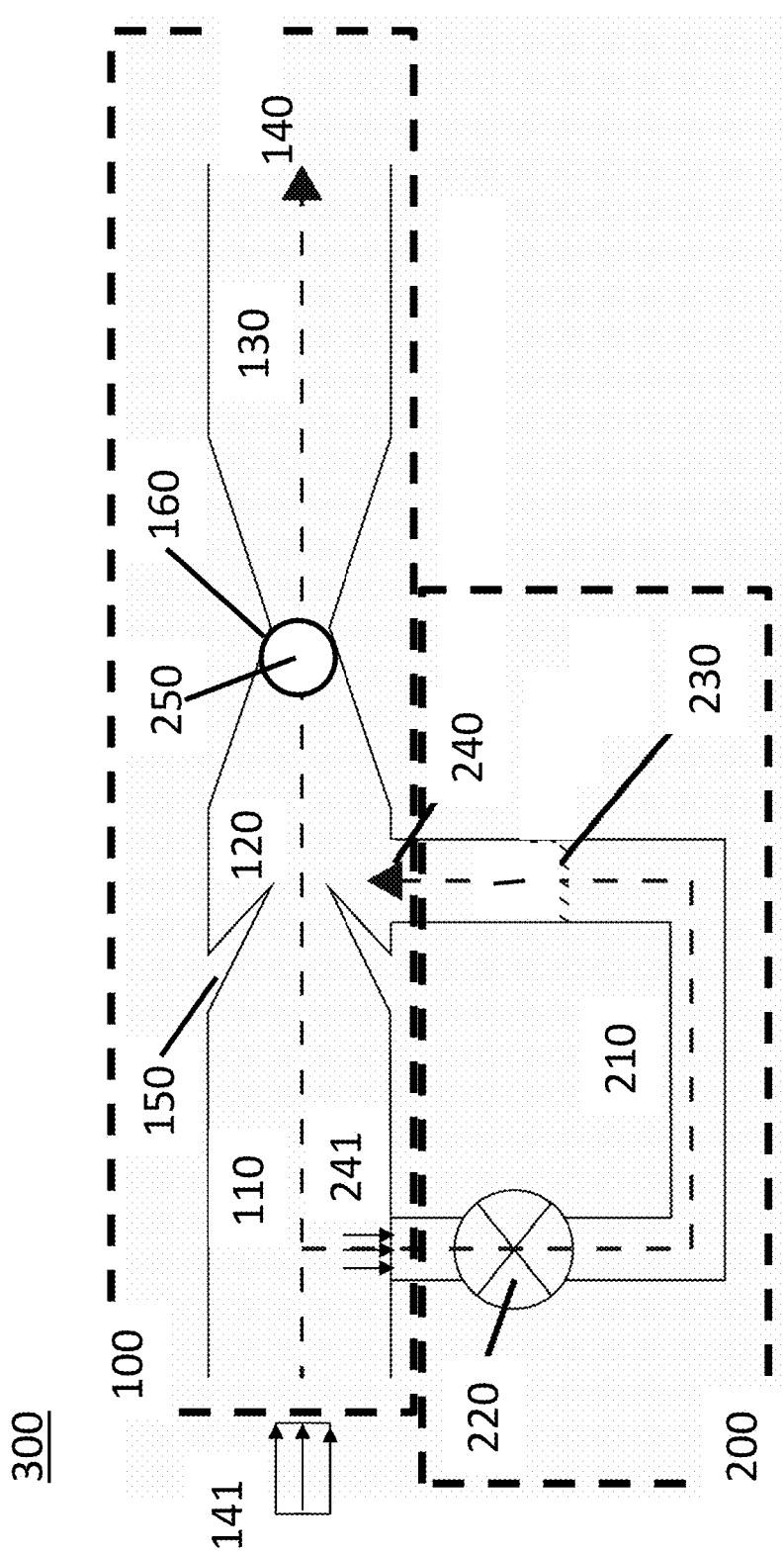

To create an automatic fluidic stop valve 300 which responds to a dramatic increase in flow rate by stopping the flow, the embodiment that is schematically illustrated in FIGS. 1A-1C was developed, prototyped and tested. As seen in FIG. 1A, for this embodiment the primary flow section 100 contains the primary flow path 140 for delivery of a primary flow 141 and comprises a concentrator 110 having a first effective flow diameter at an upstream inlet 170 and a second effective flow diameter at a downstream concentrator restriction 150, the second effective flow diameter being smaller than the first effective flow diameter. The primary flow section 100 further comprises a valve chamber 120 configured and adapted to receive an increased velocity and decreased pressure flow from the concentrator restriction 150 and to pass the flow through a valve seat 160 into a diffuser 130.

The secondary flow section 200 contains the secondary flow path 240 for delivery of a secondary flow 241 and comprises a secondary flow body 210 (e.g., tubing, pipe, channel, or other suitable structure) 210 fluidly connecting concentrator 110 to valve chamber 120 via a secondary flow damper 220 and a stop mass support 230. The secondary flow damper 220 is configured and adapted to facilitate tuning of the secondary flow 241 and resulting pressure drops, velocities, and hydrodynamic forces between the primary flow path 140 and the secondary flow path 240.

The stop mass support 230 is configured and adapted to retain the stop mass 250 in place at a starting location of the stop mass under normal or non-rupture flow conditions (e.g., by supporting the stop mass 250 against the force of gravity at a stop mass starting height a specified distance below the primary flow, alternatively adjacent or partially within the primary flow), to allow fluid flow through the secondary flow body 210 (e.g., to support the stop mass without blocking the secondary flow 241 within the secondary flow body 210 or along secondary flow path 240), and to allow the action of hydrodynamic forces (e.g., under rupture or increased flow conditions) to act on the stop mass 250 and move the stop mass 250 out of the secondary flow body 210 and into the valve chamber 120.

The valve chamber 120 is configured and adapted to allow the stop mass 250 to enter and be acted upon by the primary flow in the primary flow path 140, such that the stop mass 250 is urged under hydrodynamic forces into the valve seat 160. The valve chamber 120 is further configured and adapted to receive the stop mass 250 from the secondary flow section 200 and to position the stop mass 250 within the valve seat 160 (e.g., under hydrodynamic forces generated from fluid flow in either the primary flow path 140, the secondary flow path 240, or both, overcoming gravity, inertia, or other forces that act to inhibit motion of the stop mass 250 into the valve seat 160).

In certain embodiments the concentrator restriction 150 has a flow diameter that is constrained to be less than a flow diameter at an upstream inlet 170 of concentrator 110, increasing the flow speed and decreasing the pressure leading into a low pressure flow area in valve chamber 120 where the lower pressure induces a pressure gradient from the secondary flow body 210 through the secondary flow path 240 into the valve chamber 120. At a downstream end of the valve chamber 120, there is a valve seat 160 configured and adapted to allow the stop mass 250 to block fluid flow leading into diffuser 130 where turbulence is reduced under normal flow conditions. The lower section of secondary flow body 210 contains a stop mass 250 held up in a starting location of the stop mass below the primary flow by a stop mass support (e.g., a grating) 230 and a flow regulating secondary flow damper 220. This secondary flow damper 220 when partially (e.g., up to 75% restricted) or substantially (e.g., greater than 75% restricted) closed restricts secondary flow 240 in response to the low pressure creation in 120 as it restricts fluid flow through the secondary flow damper 220 and secondary flow body 210. When the secondary flow damper 220 is more open the fluid flow through the secondary flow body 210 provides more force urging the stop mass 250 upward. When the fluid flow through the secondary flow damper 220 is low, the weight of (or other force acting on) the stop mass 250 is greater than the fluid flow force acting on the stop mass 250 and the stop valve stays open allowing for typical flow in normal operation (e.g., as in FIG. 1A). In the event of a rupture and sudden rapid flow, the force of the secondary fluid flow 241 in the secondary flow path 240 on the stop mass 250 moves it up into the primary flow path 140 contacting primary flow 141 within the valve chamber 120 (e.g., as in FIG. 1B) and the subsequent flow of the primary flow 141 within the primary flow path 140 pushes the stop mass 250 into valve seat 160, blocking flow into the diffuser 130 and closing the stop valve (e.g., as in FIG. 1C). Once the stop mass 250 is blocking the valve seat 160 the continued pressure on the mass holds it in place in the closed position. When the rupture is repaired the pressure on the mass can be relieved by stopping primary flow 141 and releasing pressure to the concentrator 110 and returning the stop mass 250 to the open position. The sensitivity of the stop valve 300 can be tuned by the setting of the secondary flow damper 220, by changing the dimensions, mass, or other properties of the stop mass 250 (e.g., density, porosity, surface texture, and other properties), or by changing the secondary flow path 240 within the secondary flow body 210 (e.g., total volume, diameter, length, turns, restrictions, obstacles, and other properties) and around the stop mass support 230 either once installed or beforehand, optionally informed by fluid dynamic simulations, experimentation, or a standardized setup and tuning procedure.

Both the setting of the cross sectional area of the damper and the volume of fluid between the damper and the stop mass can control the response of the valve to rupture. In certain embodiments, the secondary flow damper 220 can comprise an adjustable damper such as a globe valve, needle valve, ball valve, or other valve known in the art to modulate flow, to selectively restrict the cross sectional area of fluid flow upstream of the stop mass 250, having advantages of tuning for and adapting to changing or different applications. Alternatively, a fixed area for fluid flow can be designed to suit the application (e.g., providing a secondary flow damper 220 as a fixed damper such as an orifice or venturi, optionally tunable by replacing the fixed damper, or one or more components thereof, either manually, by a mechanism, or under electronic control), having advantages of consistency and reliability. While an increasing flow through the concentrator 110 increases the Bernoulli force acting on the fluid in the secondary flow path 240 and on the stop mass 250, if there is a limited cross sectional area for fluid flow entering to the secondary flow body 210, then there is a secondary force opposing the Bernoulli force as fluid flow replenishing the fluid in the secondary flow body 210 is constrained by the secondary flow damper 220. Initially when the flow rate is just beginning to increase the damping force is low as there is not, at that time, much fluid pulled from around and below the stop mass. But as more and more fluid is pulled from the downstream region in secondary flow body 210, beyond secondary flow damper 220, the secondary force increases. This mechanism allows the valve to be less sensitive to slow, purposeful, and controlled ramping of flow while still allowing it to be responsive to abrupt ruptures.

As can be readily observed by various provided embodiments of the stop valve design, in certain embodiments there are numerous advantages, including the lack of requirement for external power to be supplied, no springs or other mechanisms which can be worn down over time, and highly rapid response to a rupture. To obtain a properly functioning stop valve for a given range of flow rates fluid dynamic simulations (or other methods, including for example, numerical simulation and scaled prototype testing) can be advantageous to determine the concentrator and diffuser diameter (e.g., an entry diameter of the diffuser relative to the respective diameters of the stop mass and valve seat and balanced with an exit diameter of the diffuser) as well as the pipe diameters and stop mass density and size.

Figure 2:
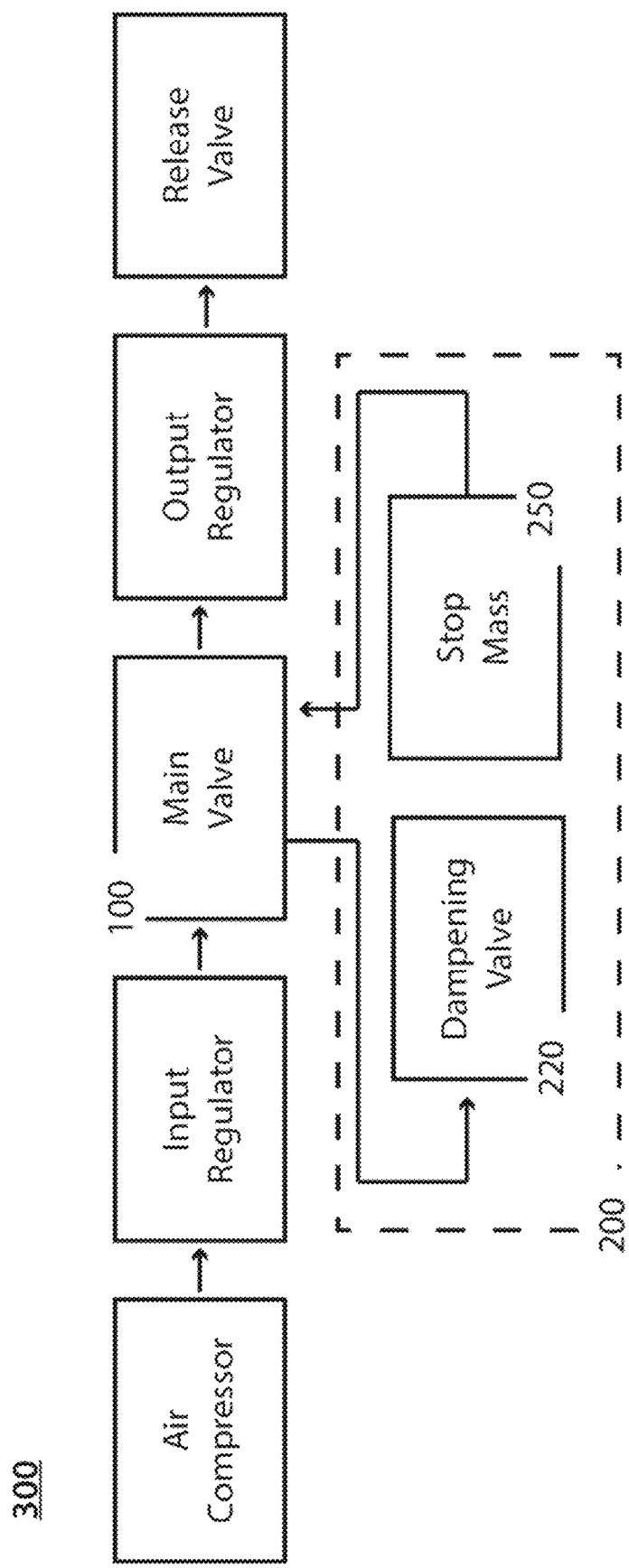
FIG. 2: Illustrates a test setup schematic showing the supporting components for the normal flow/rupture simulations according to an embodiment of the subject invention. Under normal flow the release valve remains closed and then is opened to simulate downstream pipe rupture.

In order to physically test an automatic fluidic stop valve 300 which responds to a downstream pipe rupture by closing, according to an embodiment of the subject invention, a few prototypes were fabricated using a FormLabs Form 3 SLA 3D (FormLabs, Somerville, MA) printer along with an off the shelf variable flow valve, flexible tubing, and a metal sphere as a stop mass. The prototype was tested with compressed air generated with an air compressor with controllable pressure so as to keep the pressure applied to the flexible tubing to a level below its maximum rated pressure. An additional supporting element to simulate an expected flow was a controlled flow rate valve downstream of the prototype automatic fluid-mechanical actuated emergency stop valve. Branched off from this controlled flow rate valve was a simple On/Off valve to simulate a rupture. A pressure release valve was added before the controlled flow rate valve to make repeated testing simple, although not illustrated for simplicity as it remained closed during the tests. A block diagram of the entire test system is given in FIG. 2.

Figure 3:
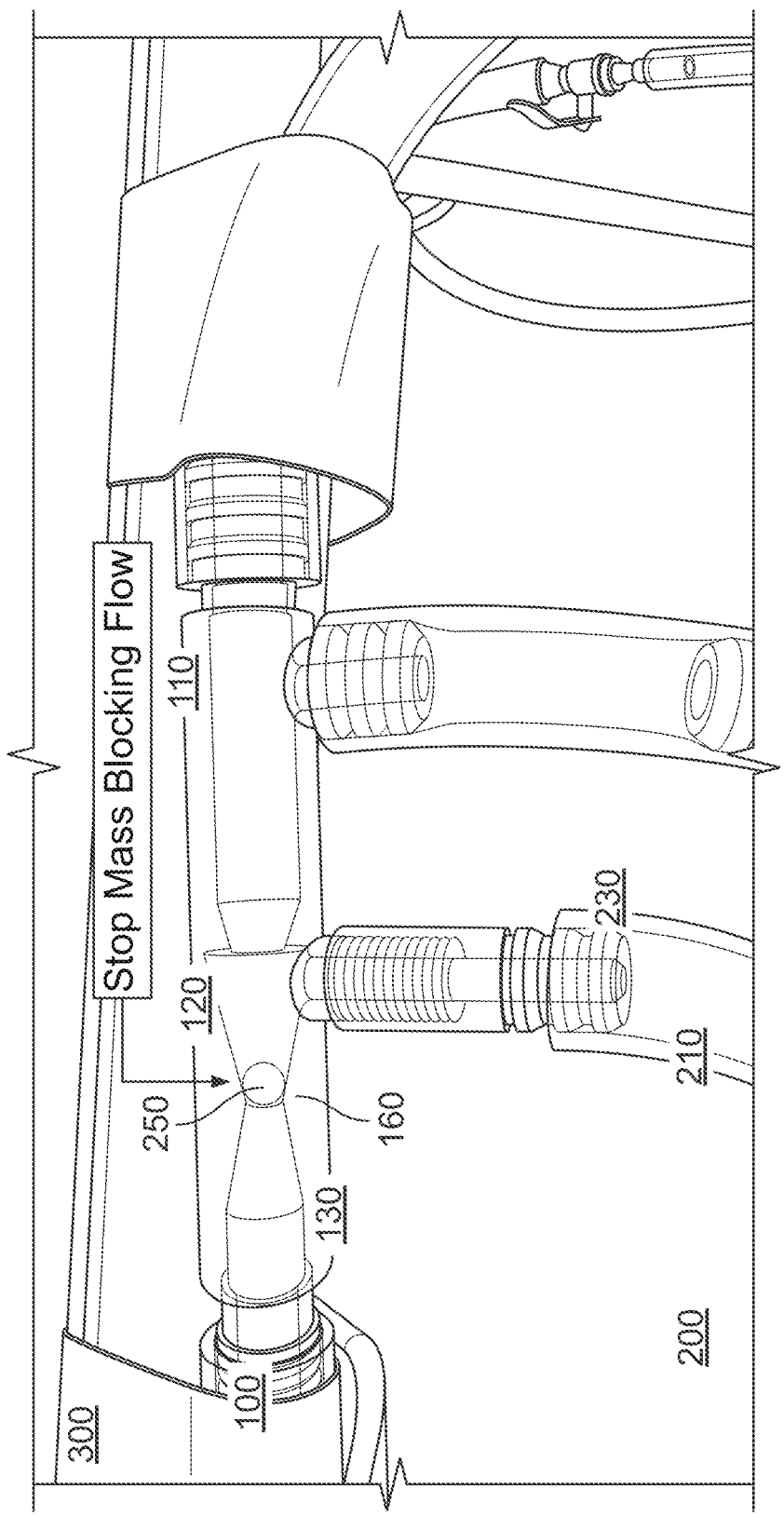
FIG. 3: Illustrates a physical prototype test setup where a release valve was opened simulating rupture and where the stop mass was forced from the grate up into the flow within the valve chamber and into the valve seat/flow stop blocking flow according to an embodiment of the subject invention.
Figure 4:
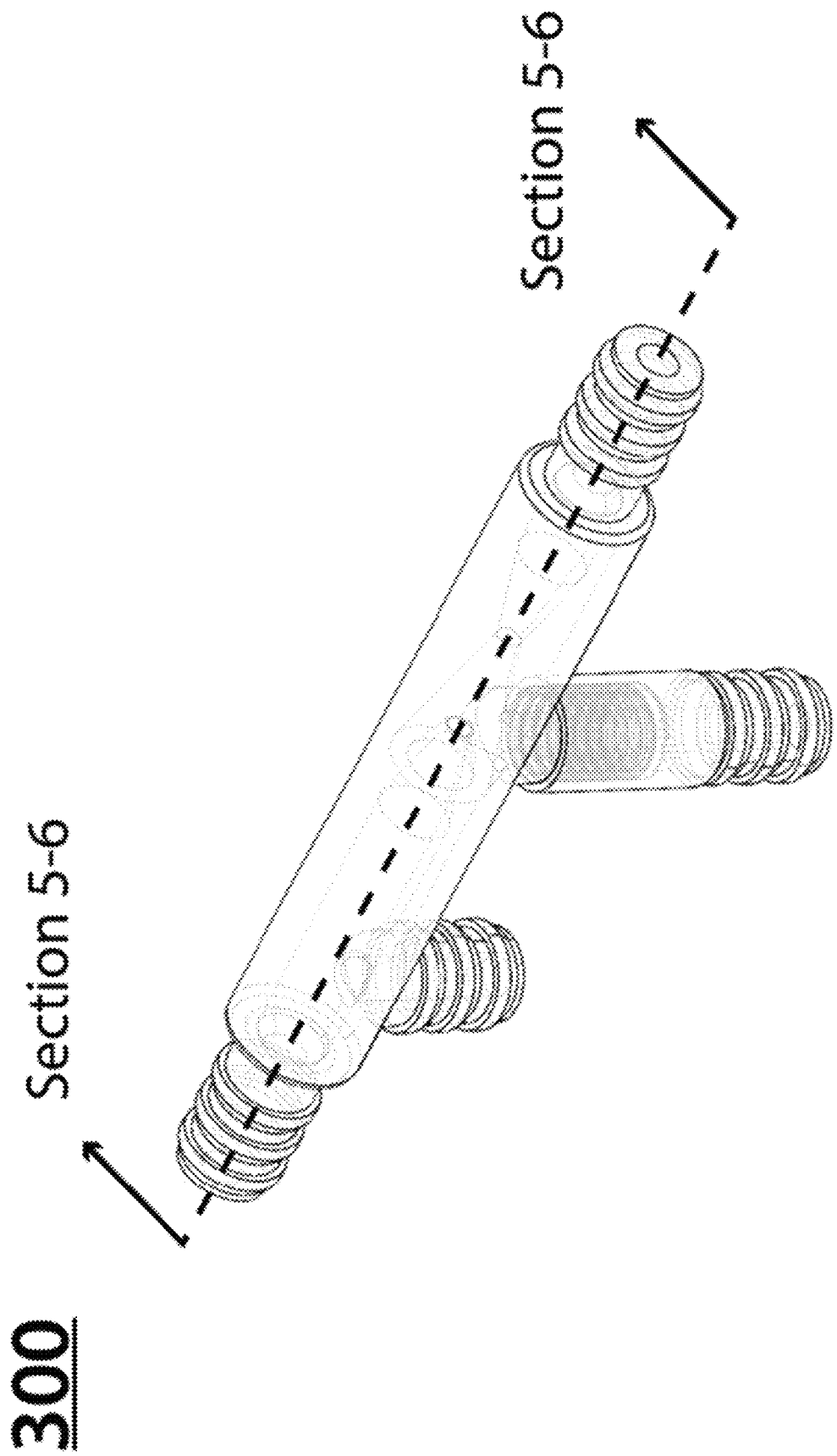
FIG. 4: Illustrates a computer aided design model according to an embodiment of the subject invention used to create the physical prototype test setup shown in FIG. 3. Section line 5-6 shows the location of the common cross section for FIG. 5 and FIG. 6.
Figure 5:
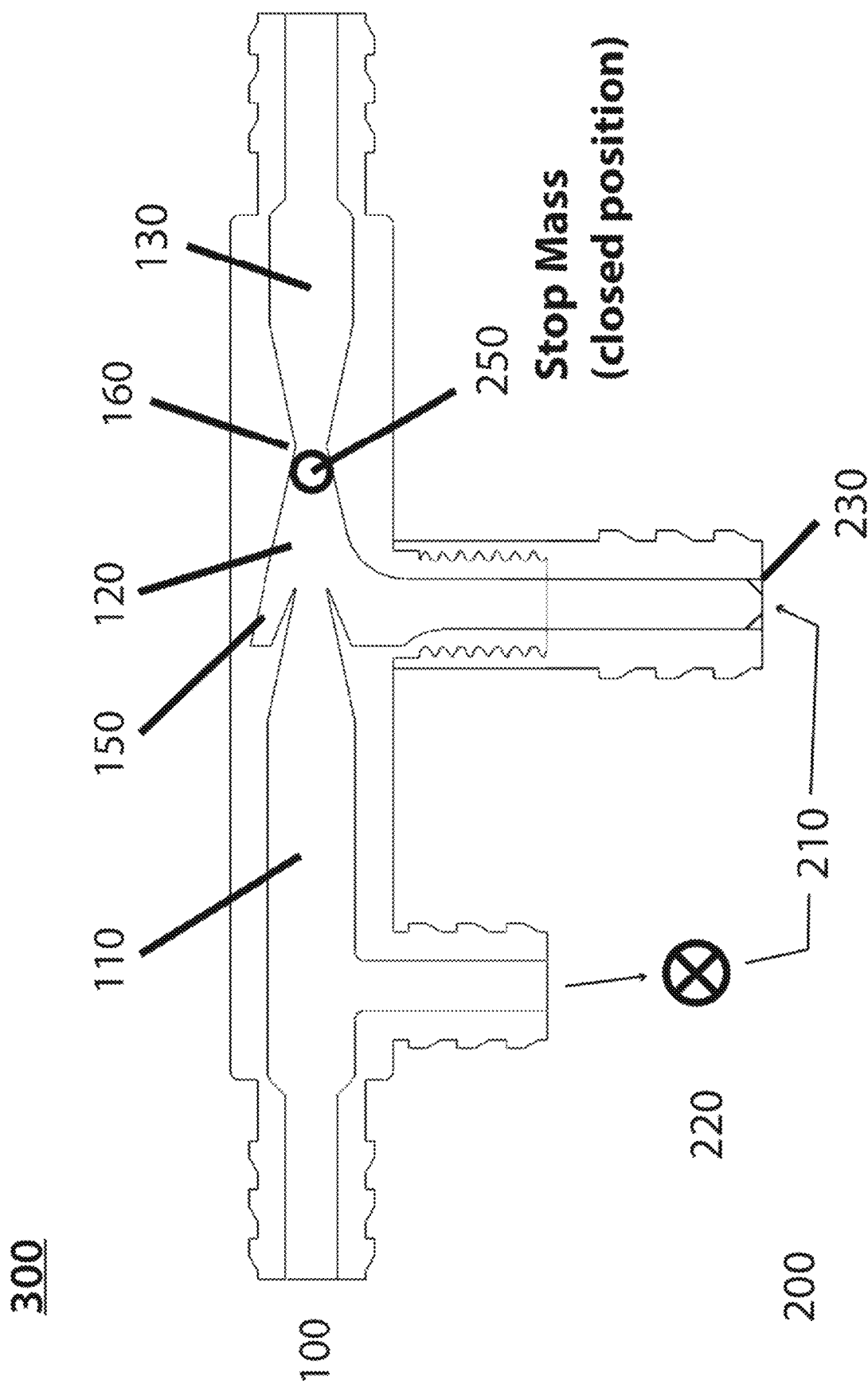
FIG. 5: Illustrates a cross section of the computer aided design model according to an embodiment of the subject invention in the closed state as shown in FIG. 1C, FIG. 3, and FIG. 10.

The results of the test under normal flow conditions showed that the stop mass remained rested on the grating after briefly rising slightly in the ramp up to normal flow. The results in response to a rupture flow show that the mass is first raised into the path of the main flow through the Bernoulli force and pushed into the valve seat region blocking the flow by the main flow itself and held in place until pressure was released. The state of the stop valve during rupture where the stop mass blocks further fluid flow is shown in FIG. 3.

The results of the rapid prototype test demonstrated the basic working principles of the stop valve in this prototype embodiment, although advantageous and effective stop valve design dimensions can vary between embodiments and can be dependent upon the specific fluid and flow rates involved. Upon determination of specific fluid and flow rates of concern, fluid dynamic simulations can be utilized to optimize the design for its intended application. Further flexibility is possible to make one design compatible with a range of flow rates with the secondary flow damper. Implementation of this invention is not limited to polymers but also contemplates metal, concrete, ceramic, and other materials depending on the use case, volumes, and fluids involved.

In order that the present disclosure may be more readily understood, certain terms are defined below, and throughout the detailed description, to provide guidance as to their meaning as used herein.

As used herein, the terms "a," "an," "the" and similar terms used in the context of the present invention are to be construed to cover both the singular and plural unless otherwise indicated herein or clearly contradicted by the context. Thus, for example, reference to "an arm" or "a hole" should be construed to cover or encompass both a singular arm or a singular hole and a plurality of arms and a plurality of holes, unless indicated otherwise or clearly contradicted by the context.

As used herein, the terms "about" and "approximately" shall generally mean an acceptable degree of error for the quantity measured given the nature or precision of the measurements. Exemplary degrees of error are within 20 percent (%), typically, within 10%, and more typically, within 5% of a given value or range of values.

As used herein, the term "and/or" should be understood to mean "either or both" of the features so conjoined, i.e., elements that are conjunctively present in some cases and disjunctively present in other cases.

As used herein, the terms "comprising", "consisting of" and "consisting essentially of" are defined according to their standard meaning. The terms may be substituted for one another herein in order to attach the specific meaning associated with each term.

As used herein, the term "or" should be understood to have the same meaning as "and/or" as defined above. For example, when separating a listing of items, "and/or" or "or" shall be interpreted as being inclusive, i.e., the inclusion of at least one, but also including more than one, of a number of items, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Materials and Methods

All patents, patent applications, provisional applications, and publications referred to or cited herein are incorporated by reference in their entirety, including all figures and tables, to the extent they are not inconsistent with the explicit teachings of this specification.

Following are examples that illustrate procedures for practicing the invention. These examples should not be construed as limiting. All percentages are by weight and all solvent mixture proportions are by volume unless otherwise noted.

In all examples where physical measurements are involved, the pressure settings are given from the new, only used for this testing application, although non lab calibrated regulators. The inlet pressures were set using the regulator built into a Porter Cable 1034.2 KPa (150 PSI) air compressor. The accuracy of the readout, and interpretation of the analog readout, is assumed to be +/−20% accurate. The nominal outlet maximum setting, where the outlet pressure is regulated, is from an SMC AR20K-01BE-B Compressed Air Regulator, which is assumed to be +/−20% accurate. The valve utilized below as the dampening valve is a Bronze Flow-Adjustment Valve, Pressure Class 125, Straight, 1/4 NPT Female, PN 4600K11 from McMaster-Carr. This valve has 1¾ turns between the fully opened and fully closed positions and a fully open flow factor of 1 (m³/hr).

Example 1—Application of the Bernoulli Equation

According to Encyclopedia Britannica, for any two points on a streamline, assuming frictionless, incompressible, steady state flow, the Bernoulli Equation implies that if the fluid flows horizontally so that no change in gravitational potential energy occurs, then a decrease in fluid pressure is associated with an increase in fluid velocity. If the fluid is flowing through a horizontal pipe of varying cross-sectional area, for example, the fluid speeds up in constricted areas so that the pressure the fluid exerts is least where the cross section is smallest. This phenomenon is sometimes called the Venturi effect, after the Italian scientist G. B. Venturi (1746-1822), who first noted the effects of constricted channels on fluid flow.

$$P + \frac{1}{2}(\rho v^2) + \rho g h = \text{constant}$$

Where P is the pressure, $\rho$ is the density, v is the velocity, h is elevation, and g is gravitational acceleration. In the case where $\rho$, g, and h are each, respectively, taken to be constant we have the following $$\Delta P + \left(\frac{1}{2}\rho\right)\Delta v^2 = 0$$

This relationship can resolve to, "pressure varies inversely with the square of velocity along the channel" or "velocity varies inversely with the square root of pressure along the channel".

In the prototype shown in FIG. 3, the inlet pressure was set to about 280 kPa (or about 40 psi.)+/−20% The outlet pressure was limited to 140 kPa (or 20 psi)+/−20% to emulate normal operation. These values (and even the use of compressed air for the test) were selected for this prototype test based in part on working ranges of available equipment, including the air compressor and off the shelf plumbing fittings. Applications of various embodiments of the subject invention contemplate a wide range of fluids (e.g., liquids, gasses, or mixed-phase flows) of different densities or material properties, and across a broad range of pressures, temperatures, flow rates, or other operating parameters. While the fluid velocity was not measured by the current setup, the narrowing of the fluid path at the concentrator is expected to produce an increased velocity as the same volume of air passes through the reduced flow area of the concentrator. Considering these factors there is some upward force expected on the stop mass, but not enough to overcome the force of gravity, or the inertia of the stationary stop mass. When there is a simulated line-break (e.g., where the outlet pressure is opened to atmospheric pressure) the decrease in outlet pressure and corresponding increase in flow velocity through the concentrator results in a larger upward force on the stop mass, thus exceeding the force of gravity.

Example 2 Tuning the Secondary Flow Damper

The purpose of the damper is to generate a pressure differential as a function of increasing flow rate to control the response of the valve to normal controlled flow fluctuations and rapid flow changes indicative of ruptures. The damper can be a fixed constricted section of pipe, or a valve with an adjustable flow cross section such as a globe valve which was used in this example. When there is a more constricted opening the pressure differential increases rapidly with flow rate to create a secondary force opposing the Bernoulli force on the stop mass. When there is a larger area opening the pressure differential increases more slowly with the flow rate creating a lower force opposing the Bernoulli force. The equation for this pressure drop is given generally by $$K_v \sqrt{SG/\Delta P}$$
$$\Delta P = Q^2 K_v^2 \cdot SG$$

Where ΔP is the pressure drop across the valve (bar), Q is the flow rate (m³/hr), SG is the specific gravity of the fluid, and $K_v$ is the flow factor (m³/hr). $K_v$ is empirically measured and can be available in lookup tables for globe valves or can be calculated for a static implementation with computational fluid dynamics. In both cases the qualitative trend is that as the area opening for fluid flow decreases, $K_v$ decreases increasing the pressure differential rise with increasing flow rate.

Figure 6:
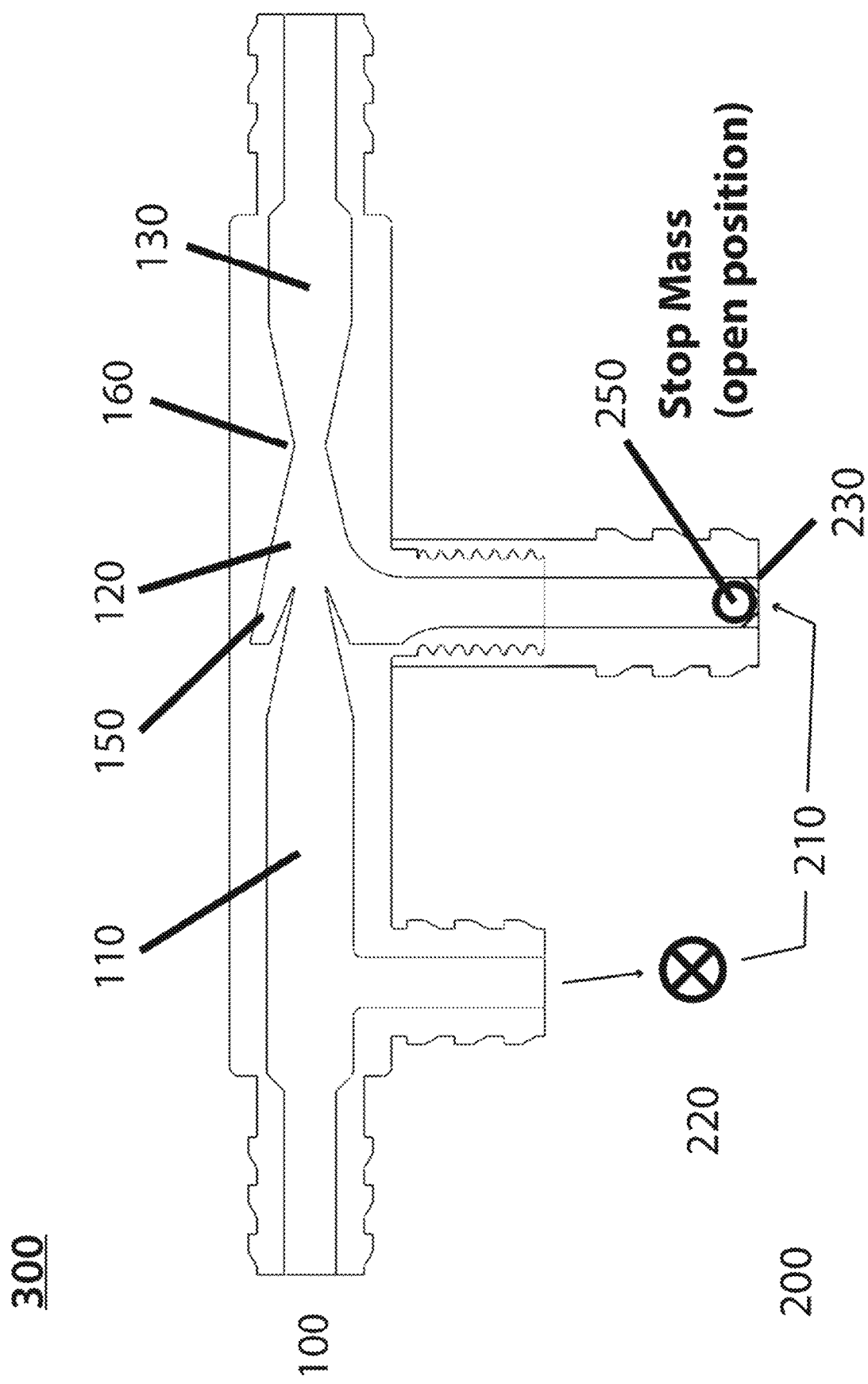
FIG. 6: Illustrates a cross section of the computer aided design model according to an embodiment of the subject invention in the open state as shown in FIG. 1A and FIG. 8.
Figure 7:
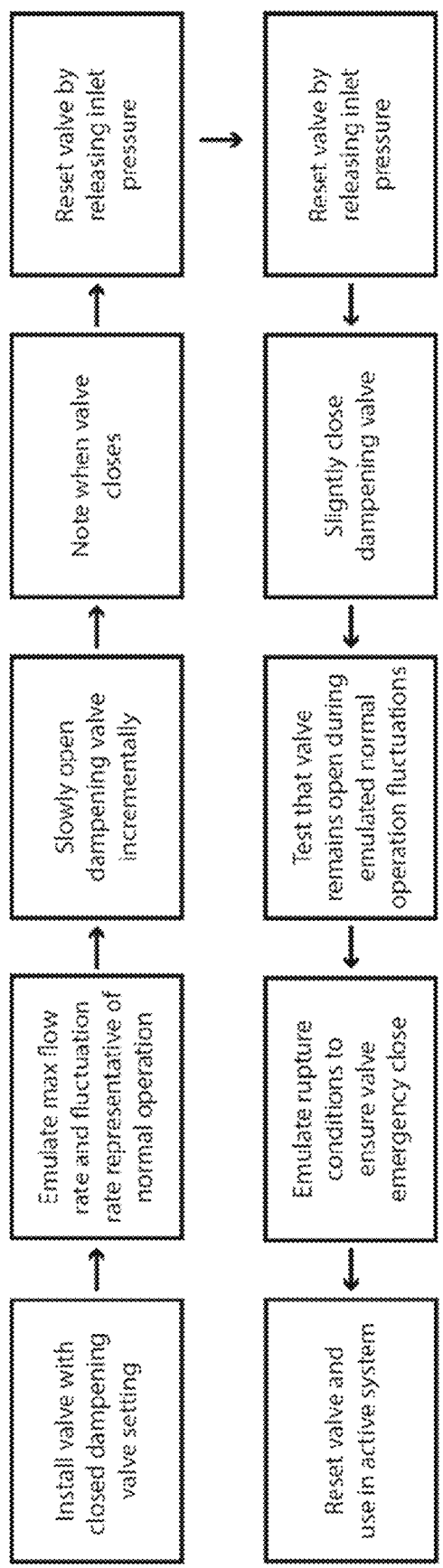
FIG. 7: Shows a process flow chart for tuning a damper in an automatic fluid-mechanical actuated emergency stop valve according to an embodiment of the subject invention.
Figure 8:
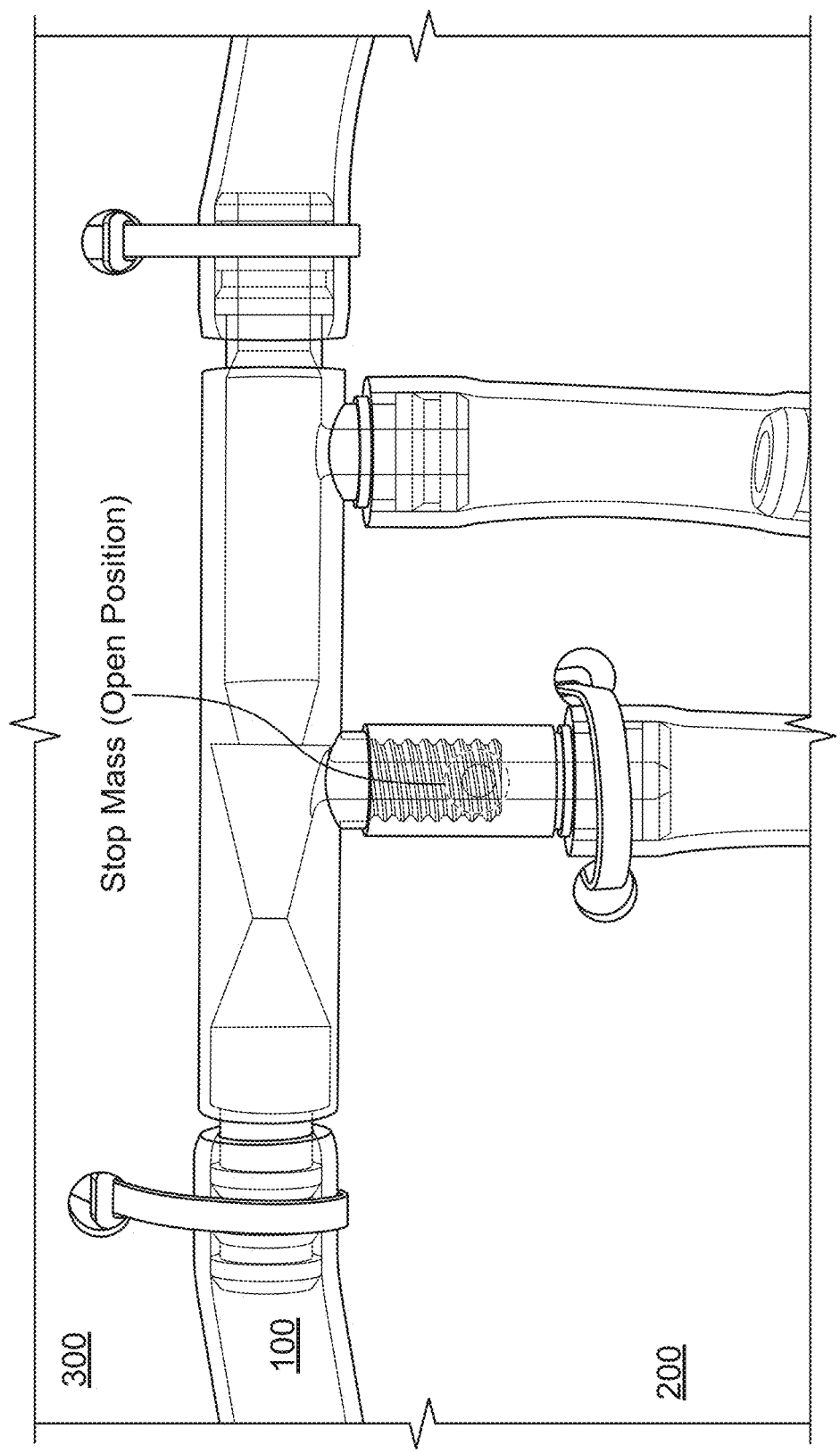
FIG. 8: Illustrates the state of the stop valve in the open position throughout steps 1 through 6 and 8-14 of FIG. 11 during the creation of Example 2, showing the stop mass resting at a starting location of the stop mass, on the stop mass support, where there is insufficient Bernoulli force to close the valve. This is representative of normal operation.
Figure 9:
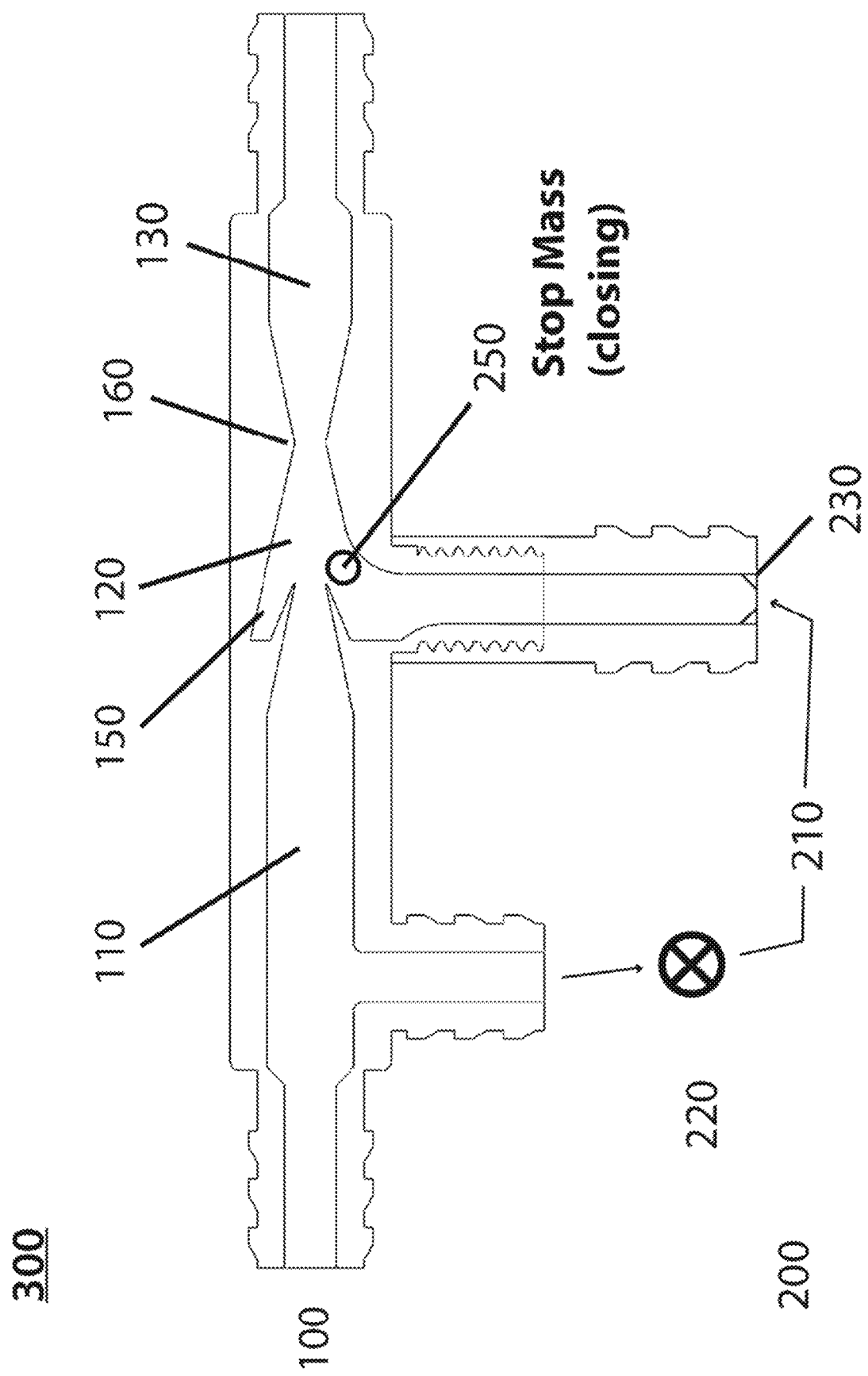
FIG. 9: Illustrates the state of the stop valve in the opening transition in the 7th step of FIG. 11 during the creation of Example 2, showing an intermediate state where the Bernoulli force has exceeded the force of gravity of the stop mass and vacuum force of the damping valve where the mass is rising up through the chamber to enter the closing position, but has not yet reached the closed position.
Figure 10:
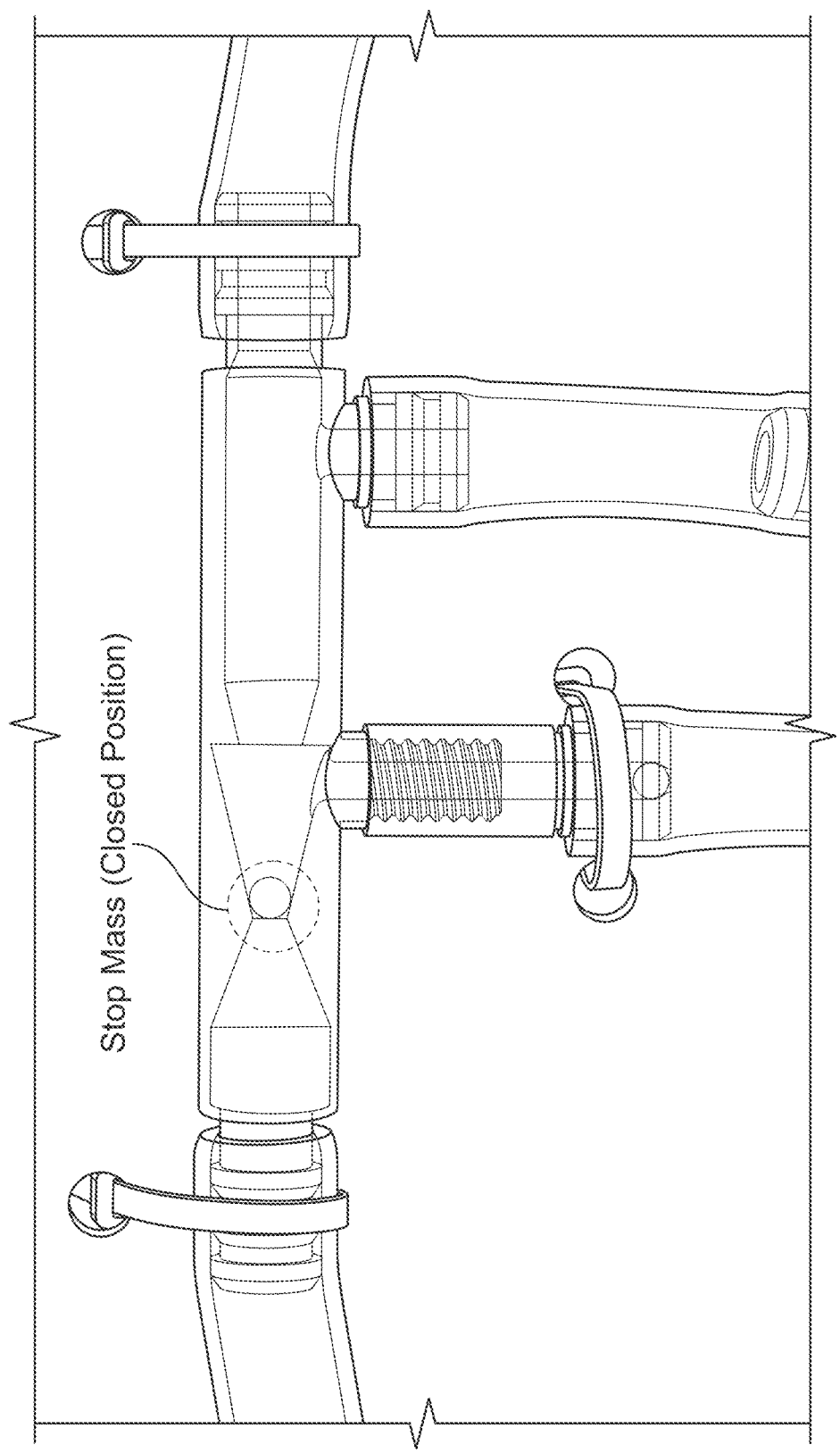
FIG. 10: Illustrates the state of the stop valve in the open position throughout steps 8 through 10 of FIG. 11 during the creation of Example 2, showing a stop mass acted upon by a Bernoulli force to close a valve seat according to an embodiment of the subject invention. When in the closed or stop position the pressure behind the mass holds it in the closed position until the emergency state is resolved, back pressure is released, and the valve is reset.
Figure 11:
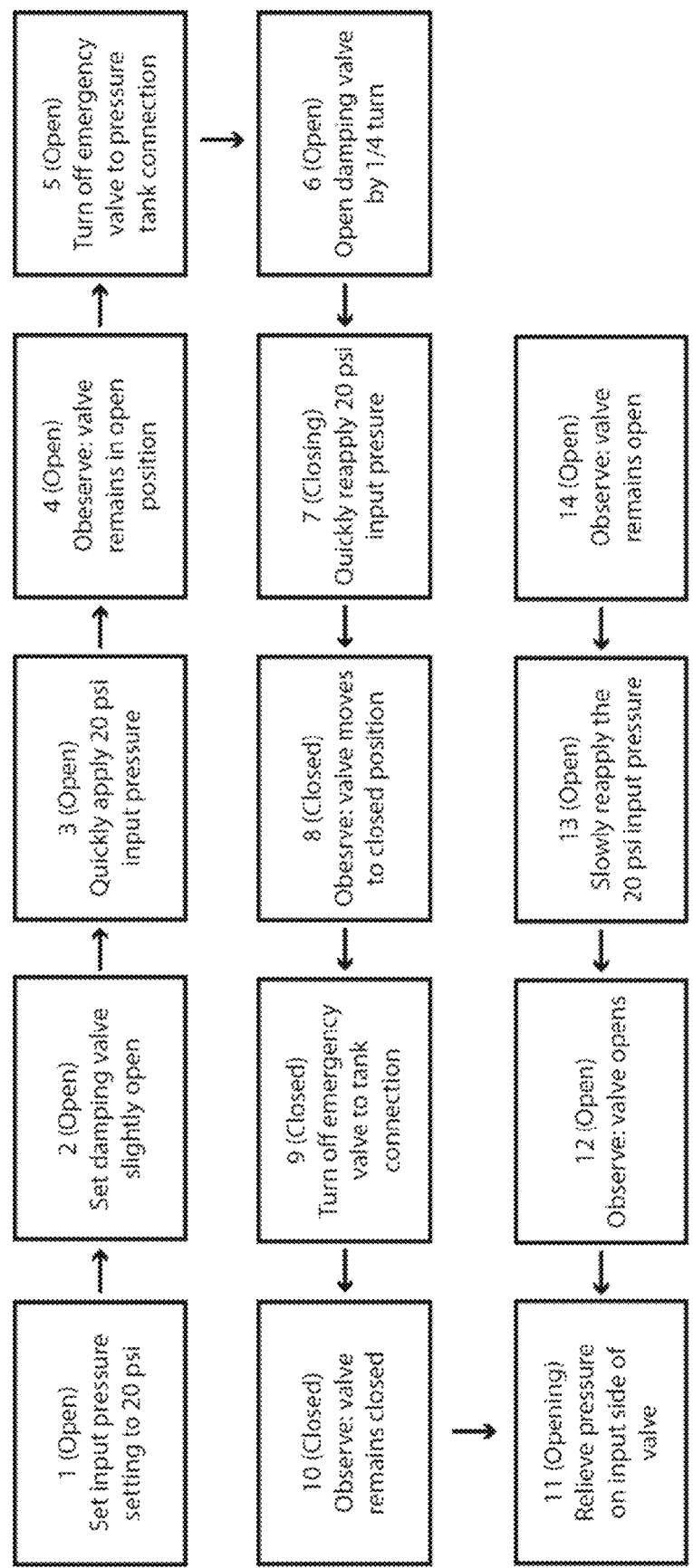
FIG. 11: Shows a process flow chart for tests which verified the proper functioning of a valve according to an embodiment of the subject invention by testing different flow rates and damping valve settings and observing whether the valve reached the closed state or remained in the open state.

A process for testing a valve according to an embodiment of the subject invention, incorporating tuning the secondary flow damper 220, in this Example an adjustable damper, is illustrated in FIG. 11. First the valve was installed in the open state with no air flowing through it. This state is represented in FIG. 6 schematically and FIG. 8 which is the actual image of the valve at that moment. After recording the photograph in FIG. 8, the damping was set to slightly open and 140 kPa (20 psi) +/−20% pressure was quickly applied to the input. It was observed that the valve remained open as the damping restriction caused by the secondary flow damper 220 and stop mass 250 weight counteracted the Bernoulli force. Pressure was relieved and the adjustable damper (secondary flow damper 220), was opened by a quarter turn. A pressure of 140 kPa (20 psi)+/−20% was then quickly applied to the input. This pressure increase caused an increase in flow through the valve such that the Bernoulli force exceeded the force of gravity on the stop mass. This resulted in the valve reaching a closing state as shown in FIG. 9, then a closed state as shown in FIG. 10.

Note that this abrupt input pressure creates a pressure differential similar to the drop in output pressure due to the prior simulated rupture scenario tested in Example 1, but at a lower value of absolute pressure. This decision in testing was taken in part to decrease risk of rupture in the 3D printed test valve, as in a real application the valve will be made of a more robust material, while the prototype relied upon available additive manufacturing materials and methods resulting in a less robust prototype valve for testing. One benefit of the printed test valve is that it is transparent to better show the underlying mechanisms of operation. It is important to note the rapidity of the closure in this testing scenario. The closure of the valve was observed to occur in less than 2 seconds. While closure time can vary depending on the specific design parameters and application of the valve, the rapid flow increase directly driving the valve closure can have speed, response time, or lag-reduction benefits when compared to indirect systems, including but not limited to an electronic sensing mechanism and separately (e.g., actively or passively) actuated closing mechanism.

Following the observed rapid valve closure, the pressure was relieved from the input to confirm an automatic return of the stop mass 250 in the valve to the open state. To simulate gradual fluctuations in differential pressure and flow rate which can occur and be allowable in an operating environment, the same input pressure was then slowly reapplied while the adjustable damper (secondary flow damper 220) was kept in the same position. In all tested cases where the pressure was slowly reapplied, the Bernoulli force failed to overcome the force of gravity and the stop mass remained in the open position, allowing for normal operation of the valve under expected normal operating conditions.

It is contemplated within the scope of the subject invention that certain design parameters, including but not limited to stop mass 250 weight, density, and geometry as well as primary flow path and secondary flow path geometry, size, shape, and flow characteristics, can be tuned individually or in coordination to produce a valve according to an embodiment of the subject invention having desirable or required flow response for normal operation paired with a desirable or required response time, lag, or closure time to produce a desired reduction in or inhibition of fluid loss in the event of a catastrophic rupture or leakage occurrence. It is further contemplated that performance of certain embodiments can be enhanced, tuned, or improved by advantageous application of certain measurement and tuning technologies such as high speed video or photography, laser or visible light sensors, hall effect or proximity sensors, flow or pressure sensors and other measurement or sensing technologies as known in the art or as may be later developed, discovered, or invented.

Example 3—Tuning Vacuum Pressure and the Secondary Flow Damper

The secondary flow damper 220 can be used to tune, restrict, reduce, or inhibit the Bernoulli force (also referred to as a vacuum pressure) on the stop mass 250. In one extreme, the secondary flow damper 220 is entirely closed during a period of increasing primary flow 141 and resulting decreasing pressure throughout the primary flow path 140, including valve chamber 120. As the pressure drops in the valve chamber 120 there will initially be some fluid flow out from secondary flow body 210 below the stop mass while the pressure in secondary flow body 210 drops from its initial pressure to match the decreasing pressure in the valve chamber 120. This flow will exert force upward on the stop mass until equilibrium is reached. In this extreme case where secondary flow damper 220 is entirely closed, the flow will be inhibited in duration and magnitude due to many factors, including the relative fluid volume and geometry of secondary flow body 210 (e.g., a large, open, and straight secondary flow body 210 can function as a fluid reservoir, providing more fluid to react to changes in pressure and flow, to effectively reduce the sensitivity and responsiveness of the valve to changes in secondary flow damper 220, while a smaller, more constricted, or tortuous secondary flow body 210 can react more directly to changes in pressure and flow, to effectively increase the sensitivity and responsiveness of the valve to changes in secondary flow damper 220.) Unless the stop mass is very light, the stop mass initial position is very close to the concentrator 110, and rupture is extremely sudden this is unlikely to result in a closure of the valve by the stop mass. This can result in unwanted continued flow through the valve under catastrophic failure conditions.

In a second extreme the secondary flow damper 220 is entirely open and the pressure in secondary flow body 210 below the stop mass 250 can equalize readily with the inlet pressure within concentrator 110 making the valve more sensitive to minor fluctuations in the outlet pressure. In this second extreme case where the secondary flow damper is fully open, secondary flow 241 can flow into secondary flow body 210, allowing greater flow and thus a greater Bernoulli force to act upon stop mass 250. This can result in unwanted stoppage of the valve under normal or desirable operating conditions. In certain embodiments, the secondary flow damper 220 is advantageously applied to tune a desired stop mass response to stop the primary flow 141 through the valve at a flow condition between normal or desirable operating conditions and catastrophic failure conditions.

Consider an industrial hazardous gas system where the gas flow or output can be utilized by a number of tools. In a first instance where the secondary flow damper 220 is entirely open, if one or more tools are in use with normal operating flows of the gas there can be enough force on the stop mass created by that flow to close the main valve. If a second instance where the secondary flow damper 220 is entirely closed, the sudden outlet pressure drop from a catastrophic rupture can fail to exert enough force on the mass to close the main valve. Somewhere between these two extremes normal utilization of the tools can be achieved without closing the main valve, while a rupture will close the main valve. If more tools are added to the system this threshold flow rate can be adjusted without changing the stop mass or main valve but rather changing the setting of the damping valve.

In one embodiment, a process to achieve this tuning can be to utilize a non-hazardous test gas with sufficiently similar density to the gas of concern and simulate the flow through simultaneous tool utilization starting with the secondary flow damper 220 closed. While turning off and on the simulated flow the adjustable damper (secondary flow damper 220) can be slowly opened until the main valve closes due to the simulated flow. Following this the adjustable damper (secondary flow damper 220) can be closed slightly, simulated flow can be tested to demonstrate an absence of a false positive closure, and a rupture can be simulated to demonstrate a closure in response to a catastrophic line failure. Finally the non-hazardous gas can be disconnected and the valve can be installed into the environment following proper safety guidance.

Example 4—Prospective Application of Transient Flow Models and Simulation

Although certain operating principles of the subject invention can be better illustrated through the understanding and application of static, pseudo-static, or steady state approximations and related formulations derived from the Bernoulli principle and/or Venturi effect, in many applications the dynamic and transient flow nature of rupture or even normal utilization can be significant. It is contemplated within the scope of the subject invention that design and tuning of certain embodiments can be advantageously enhanced by application of models or equations comprising static, pseudo-static, dynamic, viscous, non-viscous, compressible, incompressible, laminar, or turbulent flows, and that a parameterized fluid mechanical model and/or finite element simulation can be employed to emulate a range of normal operating conditions and rupture conditions, thus informing the design, tuning, or operation of various embodiments of the subject invention.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

EXEMPLIFIED EMBODIMENTS

The invention may be better understood by reference to certain illustrative examples, including but not limited to the following:

Embodiment 1. An automatic fluidic stop valve 300 configured and adapted to respond to a sudden increase in a primary fluid flow 141 through the valve by inhibiting the primary fluid flow 141, the automatic fluidic stop valve 300 comprising a stop mass 250 acted upon by a Bernoulli force to block a valve seat 160 and inhibit the primary fluid flow 141.

Embodiment 2. The automatic fluidic stop valve 300 of Embodiment 1, comprising a concentrator 110 configured and adapted to increase the speed of the primary fluid flow 141 locally near a starting location of the stop mass 250, thereby reducing a pressure of the primary fluid flow 141 locally near the starting location of the stop mass 250 and amplifying the Bernoulli force.

Embodiment 3. The automatic fluidic stop valve 300 of Embodiment 2, comprising a diffuser 130 configured and adapted to reduce turbulence in the primary fluid flow 141 downstream of the concentrator 110.

Embodiment 4. The automatic fluidic stop valve 300 of Embodiment 3, where an entry diameter of the diffuser 130 is less than an outer diameter of the stop mass 250.

Embodiment 5. The automatic fluidic stop valve 300 of Embodiment 2, comprising a secondary flow path fluidly connecting the primary fluid flow 141 from a first location to a second location, the first location upstream of the concentrator 110, the second location downstream of the concentrator 110 and upstream of the valve seat 160.

Embodiment 6. The automatic fluidic stop valve 300 of Embodiment 5, wherein the stop mass 250 is supported at the starting location of the stop mass 250 by a stop mass support 230 at a stop mass starting height below a level of the primary fluid flow 141 adjacent the second location.

Embodiment 7. The automatic fluidic stop valve 300 of Embodiment 6, wherein the stop mass support 230 is configured and adapted to:
  (a) retain the stop mass 250 in place under normal or non-rupture flow conditions by supporting the stop mass 250 against the force of gravity;
  (b) allow sufficient secondary fluid flow through the secondary flow body 210 without blocking the secondary flow body 210 or secondary flow path 240; and
  (c) allow sufficient space for the action of hydrodynamic forces under rupture or increased flow conditions to act on the stop mass 250 and move the stop mass 250 out of the secondary flow body 210 and into the primary fluid flow 141 upstream of the valve seat 160.

Embodiment 8. The automatic fluidic stop valve 300 of Embodiment 5, comprising a secondary flow damper 220, the secondary flow damper 220 comprising an adjustable damper configured and adapted to selectively inhibit a secondary flow through the secondary flow path, thereby selectively tuning the Bernoulli force.

Embodiment 9. The automatic fluidic stop valve 300 of Embodiment 5, comprising a secondary flow damper 220, the secondary flow damper 220 comprising a fixed damper configured and adapted to consistently inhibit a secondary flow through the secondary flow path, thereby consistently tuning the Bernoulli force.

Embodiment 10. The automatic fluidic stop valve 300 of Embodiment 9, wherein the fixed damper of secondary flow damper 220 is configured and adapted for selective replacement with one or more alternative fixed dampers, each of which, respectively, inhibits the secondary flow through the secondary flow path to a different degree, thereby selectively tuning the Bernoulli force.

Embodiment 11. The automatic fluidic stop valve 300 of Embodiment 1, wherein the stop mass 250 is a sphere.

Embodiment 12. The automatic fluidic stop valve 300 of Embodiment 1, wherein the sphere comprises a metallic or polymeric material.

Embodiment 13. The automatic fluidic stop valve 300 of Embodiment 1, wherein the valve seat 160 comprises a partial spherical mating surface having a diameter that is sized to match an outer diameter of the stop mass 250.

Embodiment 14. The automatic fluidic stop valve 300 of Embodiment 1, wherein the stop mass 250 and the valve seat 160 are each respectively configured and adapted such that after the stop mass 250 is drawn into the valve seat 160 by the Bernoulli force, the stop mass 250 seals to the valve seat 160 to stop the primary fluid flow 141.

Embodiment 15. The automatic fluidic stop valve 300 of Embodiment 14, wherein one or both of the stop mass 250 or the valve seat 160 is compressible or comprises a compressible sealing material.

Embodiment 16. The automatic fluidic stop valve 300 of Embodiment 5, wherein the secondary flow path fluidly connecting the primary fluid flow 141 from the first location to the second location comprises:
  a first upward flow direction departing the primary fluid flow 141 at the first location, followed by,
  a second downward flow direction below the concentrator 110, followed by,
  a third upward flow direction arriving back to the primary fluid flow 141 at the second location, and
  a particulate trap configured and adapted to inhibit the passage of particulates through the secondary flow path.

Embodiment 17. A method for tuning an automatic fluidic stop valve 300 for inhibiting a primary fluid flow 141 following a catastrophic rupture or other failure in a fluid delivery system carrying a fluid from an upstream source to a downstream destination, the method comprising:
  providing an automatic fluidic stop valve 300 configured and adapted to respond to a sudden increase in the primary fluid flow 141 through the automatic fluidic stop valve 300 by inhibiting the primary fluid flow 141, the automatic fluidic stop valve 300 comprising:
    a stop mass 250 acted upon by a Bernoulli force to block a valve seat 160 and inhibit the primary fluid flow 141;
    a concentrator 110 configured and adapted to increase the speed of the primary fluid flow 141 locally near a starting location of the stop mass, thereby reducing a pressure of the primary fluid flow 141 locally near the starting location of the stop mass 250 and amplifying the Bernoulli force;
    a diffuser 130 configured and adapted to reduce turbulence in the primary fluid flow 141 downstream of the concentrator 110, where an entry diameter of the diffuser 130 is less than an outer diameter of the stop mass 250;
    a secondary flow path within a secondary flow body 210 fluidly connecting the primary fluid flow 141 from a first location to a second location, the first location upstream of the concentrator 110, the second location downstream of the concentrator 110 and upstream of the valve seat 160 and;
    a secondary flow damper 220, the secondary flow damper 220 comprising an adjustable damper configured and adapted to selectively inhibit a secondary flow through the secondary flow path, thereby selectively tuning the Bernoulli force;
  wherein the stop mass 250 is supported at the starting location of the stop mass 250 by a stop mass support 230 at a stop mass starting height below a level of the primary fluid flow 141 adjacent the second location;
  providing the primary fluid flow 141 at a desired maximal primary flow rate into a primary flow section 100 through the concentrator 110, valve seat 160, and diffuser 130; and
  slowly opening the adjustable damper of the secondary flow damper 220 to a first position where a resulting maximal secondary flow 241 in the secondary flow body 210 is sufficient to move the stop mass 250 from the stop mass support 230, out of the secondary flow body 210, into the primary flow 141, and into the valve seat 160, thus inhibiting the primary flow at the valve seat 160.

Embodiment 18. The method according to Embodiment 17, comprising:
  stopping the primary flow 141 upstream of the valve seat 160, and releasing any remaining pressure upstream of the valve seat 160;
  allowing the stop mass 250 to return to the stop mass support 230 within the secondary flow body 210;
  closing the adjustable damper of the secondary flow damper 220 a predetermined amount from the first position to a second position where a resulting submaximal secondary flow 241 in the secondary flow body 210 is expected to be insufficient to move the stop mass 250 from the stop mass support 230, and does not result in blocking of the primary flow between the valve chamber 120 and the diffuser 130.

Embodiment 19. The method according to Embodiment 18, comprising:
  fixing the adjustable damper of the secondary flow damper 220 in the second position; and
  placing the stop valve in service by connecting the stop valve to a flow source configured and adapted to provide a primary flow rate less than the desired maximal primary flow rate into the primary flow section 100 through the concentrator 110, valve seat 160, and diffuser 130.

Embodiment 20. An automatic fluidic stop valve 300 configured and adapted to respond to a sudden increase in a primary fluid flow 141 through the valve by inhibiting the primary fluid flow 141, the automatic fluidic stop valve 300 comprising:
  a stop mass 250 acted upon by a Bernoulli force to block a valve seat 160 and inhibit the primary fluid flow 141;
  a concentrator 110 configured and adapted to increase the speed of the primary fluid flow 141 locally near a starting location of the stop mass 250, thereby reducing a pressure of the primary fluid flow 141 locally near the starting location of the stop mass 250 and amplifying the Bernoulli force;
  a diffuser 130 configured and adapted to reduce turbulence in the primary fluid flow 141 downstream of the concentrator 110, where an entry diameter of the diffuser 130 is less than an outer diameter of the stop mass 250;
a secondary flow path fluidly connecting the primary fluid flow 141 from a first location to a second location, the first location upstream of the concentrator 110, the second location downstream of the concentrator 110 and upstream of the valve seat 160 and;
a secondary flow damper 220 comprising an adjustable damper configured and adapted to selectively inhibit a secondary flow through the secondary flow path, thereby selectively tuning the Bernoulli force;
wherein the stop mass 250 is supported at the starting location of the stop mass 250 by a stop mass support 230 at a stop mass starting height below a level of the primary fluid flow 141 adjacent the second location;
wherein the stop mass support 230 is configured and adapted to:
(a) retain the stop mass 250 in place under normal or non-rupture flow conditions by supporting the stop mass 250 against the force of gravity,
(b) allow sufficient primary fluid flow 141 through the secondary flow body 210 without blocking the secondary flow body 210 or secondary flow path 240, and
(c) allow sufficient space for the action of hydrodynamic forces under rupture or increased flow conditions to act on the stop mass 250 and move the stop mass 250 out of the secondary flow body 210 and into the primary fluid flow 141 upstream of the valve seat 160.

Although the present invention has been illustrated and described herein with reference to preferred embodiments and specific examples thereof, it will be readily apparent to those of ordinary skill in the art that other embodiments and examples may perform similar functions and/or achieve like results.

I claim:

1. An automatic fluidic stop valve configured and adapted to respond to a sudden increase in a primary fluid flow through the valve by inhibiting the primary fluid flow, the automatic fluidic stop valve comprising: a stop mass configured to be acted upon by a Bernoulli force to block a valve seat and inhibit the primary fluid flow;
a concentrator configured and adapted to increase a speed of the primary fluid flow locally near a starting location of the stop mass, thereby reducing a pressure of the primary fluid flow locally near the starting location of the stop mass and amplifying the Bernoulli force:
a secondary flow path fluidly connecting the primary fluid flow from a first location to a second location, the first location upstream of the concentrator, the second location downstream of the concentrator and upstream of the valve seat; and
a secondary flow damper, the secondary flow damper comprising an adjustable damper configured and adapted to selectively inhibit a secondary flow through the secondary flow path, thereby selectively tuning the Bernoulli force.

2. The automatic fluidic stop valve of claim 1, wherein the stop mass is a sphere.

3. The automatic fluidic stop valve of claim 1, wherein the sphere comprises a metallic or polymeric material.

4. The automatic fluidic stop valve of claim 1, wherein the valve seat comprises a partial spherical mating surface having a diameter that is sized to match an outer diameter of the stop mass.

5. The automatic fluid stop valve of claim 1, comprising a diffuser configured and adapted to reduce turbulence in the primary fluid flow downstream of the concentrator.

6. The automatic fluidic stop valve of claim 5, where an entry diameter of the diffuser is less than an outer diameter of the stop mass.

7. The automatic fluid stop valve of claim 1, wherein the stop mass is supported at the starting location of the stop mass by a stop mass support at a stop mass starting height below a level of the primary fluid flow adjacent the second location.

8. The automatic fluidic stop valve of claim 7, wherein the stop mass support is configured and adapted to:
(a) retain the stop mass in place under normal or non-rupture flow conditions by supporting the stop mass against the force of gravity;
(b) allow sufficient secondary fluid flow through the secondary flow body without blocking a secondary flow body or secondary flow path; and
(c) allow sufficient space for an action of hydrodynamic forces under rupture or increased flow conditions to act on the stop mass and move the stop mass out of the secondary flow body and into the primary fluid flow upstream of the valve seat.

9. The automatic fluid stop valve of claim 1, comprising a secondary flow damper, the secondary flow damper comprising a fixed damper configured and adapted to consistently inhibit a secondary flow through the secondary flow path, thereby consistently tuning the Bernoulli force.

10. The automatic fluidic stop valve of claim 9, wherein the fixed damper of secondary flow damper is configured and adapted for selective replacement with one or more alternative fixed dampers, each of which, respectively, inhibits the secondary flow through the secondary flow path to a different degree, thereby selectively tuning the Bernoulli force.

11. The automatic fluidic stop valve of claim 1, wherein the stop mass and the valve seat are each respectively configured and adapted such that after the stop mass is drawn into the valve seat by the Bernoulli force, the stop mass seals to the valve seat to stop the primary fluid flow.

12. The automatic fluidic stop valve of claim 11, wherein one or both of the stop mass or the valve seat is compressible or comprises a compressible sealing material.

13. An automatic fluidic stop valve configured and adapted to respond to a sudden increase in a primary fluid flow through the valve by inhibiting the primary fluid flow, the automatic fluidic stop valve comprising:
a stop mass configured to be acted upon by a Bernoulli force to block a valve seat and inhibit the primary fluid flow;
a concentrator configured and adapted to increase a speed of the primary fluid flow locally near a starting location of the stop mass, thereby reducing a pressure of the primary fluid flow locally near the starting location of the stop mass and amplifying the Bernoulli force;
a secondary flow path fluidly connecting the primary fluid flow from a first location to a second location, the first location upstream of the concentrator, the second location downstream of the concentrator and upstream of the valve seat, wherein the secondary flow path fluidly connecting the primary fluid flow from the first location to the second location comprises:
a first upward flow direction departing the primary fluid flow at the first location, followed by,
a second downward flow direction below the concentrator, followed by, a third upward flow direction arriving back to the primary fluid flow at the second location, and a particulate trap configured and adapted to inhibit the passage of particulates through the secondary flow path.

14. A method for tuning an automatic fluidic stop valve for inhibiting a primary fluid flow following a catastrophic rupture or other failure in a fluid delivery system carrying a fluid from an upstream source to a downstream destination, the method comprising:

providing an automatic fluidic stop valve configured and adapted to respond to a sudden increase in the primary fluid flow through the automatic fluidic stop valve by inhibiting the primary fluid flow, the automatic fluidic stop valve comprising:

a stop mass configured to be acted upon by a Bernoulli force to block a valve seat and inhibit the primary fluid flow;

a concentrator configured and adapted to increase a speed of the primary fluid flow locally near a starting location of the stop mass, thereby reducing a pressure of the primary fluid flow locally near the starting location of the stop mass and amplifying the Bernoulli force;

a diffuser configured and adapted to reduce turbulence in the primary fluid flow downstream of the concentrator, where an entry diameter of the diffuser is less than an outer diameter of the stop mass;

a secondary flow path within a secondary flow body fluidly connecting the primary fluid flow from a first location to a second location, the first location upstream of the concentrator, the second location downstream of the concentrator and upstream of the valve seat and;

a secondary flow damper, the secondary flow damper comprising an adjustable damper configured and adapted to selectively inhibit a secondary flow through the secondary flow path, thereby selectively tuning the Bernoulli force;

wherein the stop mass is supported at the starting location of the stop mass by a stop mass support at a stop mass starting height below a level of the primary fluid flow adjacent the second location;

providing the primary fluid flow at a desired maximal primary flow rate into a primary flow section through the concentrator, valve seat, and diffuser; and slowly opening the adjustable damper of the secondary flow damper to a first position where a resulting maximal secondary flow in the secondary flow body is sufficient to move the stop mass from the stop mass support, out of the secondary flow body, into the primary fluid flow, and into the valve seat, thus inhibiting the primary fluid flow at the valve seat.

15. The method according to claim 14, comprising:

stopping the primary fluid flow upstream of the valve seat, and releasing any remaining pressure upstream of the valve seat;

allowing the stop mass to return to the stop mass support within the secondary flow body;

closing the adjustable damper of the secondary flow damper a predetermined amount from the first position to a second position where a resulting sub-maximal secondary flow in the secondary flow body is expected to be insufficient to move the stop mass from the stop mass support, and does not result in blocking of the primary fluid flow between the valve chamber and the diffuser.

16. The method according to claim 15, comprising:

fixing the adjustable damper of the secondary flow damper in the second position; and placing the stop valve in service by connecting the stop valve to a flow source configured and adapted to provide a primary flow rate less than the desired maximal primary flow rate into the primary flow section through the concentrator, valve seat, and diffuser.

17. An automatic fluidic stop valve configured and adapted to respond to a sudden increase in a primary fluid flow through the valve by inhibiting the primary fluid flow, the automatic fluidic stop valve comprising:

a stop mass configured to be acted upon by a Bernoulli force to block a valve seat and inhibit the primary fluid flow;

a concentrator configured and adapted to increase a speed of the primary fluid flow locally near a starting location of the stop mass, thereby reducing a pressure of the primary fluid flow locally near the starting location of the stop mass and amplifying the Bernoulli force;

a diffuser configured and adapted to reduce turbulence in the primary fluid flow downstream of the concentrator, where an entry diameter of the diffuser is less than an outer diameter of the stop mass;

a secondary flow path fluidly connecting the primary fluid flow from a first location to a second location, the first location upstream of the concentrator, the second location downstream of the concentrator and upstream of the valve seat and;

a secondary flow damper comprising an adjustable damper configured and adapted to selectively inhibit a secondary flow through the secondary flow path, thereby selectively tuning the Bernoulli force;

wherein the stop mass is supported at the starting location of the stop mass by a stop mass support at a stop mass starting height below a level of the primary fluid flow adjacent the second location;

wherein the stop mass support is configured and adapted to:

(a) retain the stop mass in place under normal or non-rupture flow conditions by supporting the stop mass against the force of gravity, (b) allow sufficient primary fluid flow through a secondary flow body without blocking the secondary flow body or secondary flow path, and (c) allow sufficient space for the action of hydrodynamic forces under rupture or increased flow conditions to act on the stop mass and move the stop mass out of the secondary flow body and into the primary fluid flow upstream of the valve seat.

* * * * *